(No Model.)
E. J. MALLETT. Jr.
APPARATUS FOR DISINFECTING WATER CLOSETS, &c.
No. 253,400. Patented Feb. 7, 1882.
Fig. 1,
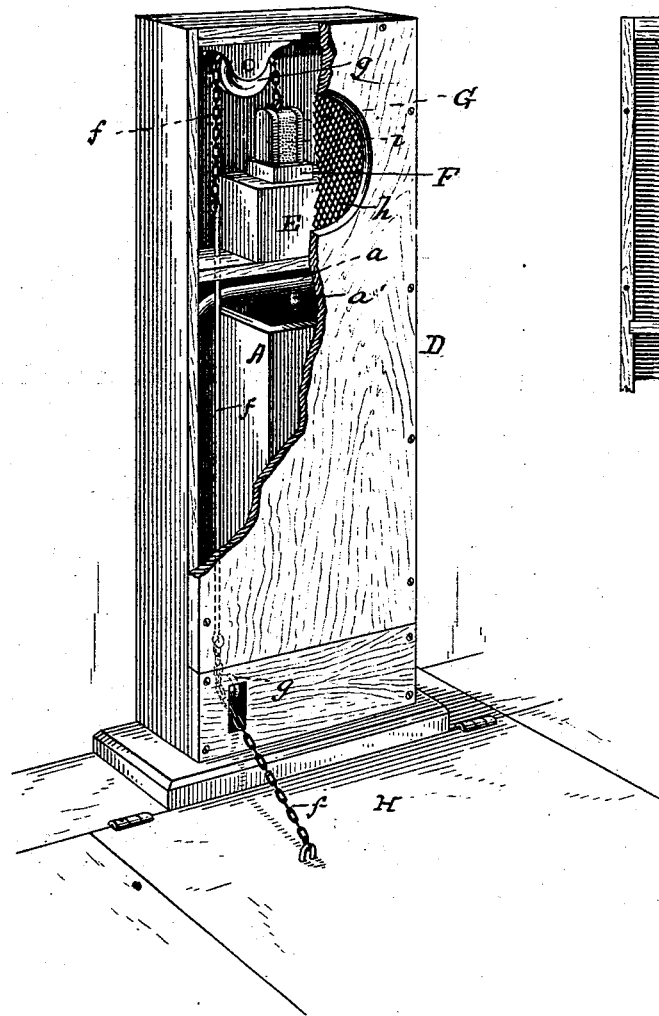
Fig. 2,
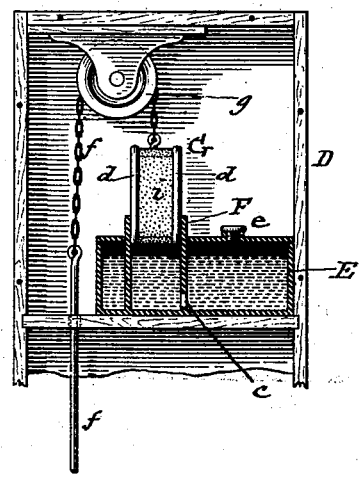
WITNESSES
Geo. W. Breck
E. A. Dick
By his Attorney
INVENTOR
E. J. Mallett Jr.
M. Bailey

UNITED STATES PATENT OFFICE.

EDWARD J. MALLETT, JR., OF NEW YORK, N. Y.

APPARATUS FOR DISINFECTING WATER-CLOSETS, &c.

SPECIFICATION forming part of Letters Patent No. 253,400, dated February 7, 1882.

Application filed November 12, 1881. (No model.)

*To all whom it may concern:*

Be it known that I, EDWARD J. MALLETT, Jr., of the city, county, and State of New York, have invented certain new and useful Improvements in Apparatus for Disinfecting Water-Closets and the like, of which the following is a specification.

My improvement relates to the system of disinfecting water-closets and the like set forth in my Reissued Letters Patent No. 9,068, of February 10, 1880. Under that system the closet-bowl is continuously supplied with a suitable disinfecting-liquid—such as chloride of zinc—while air charged with thymol or other suitable volatile disinfectant is intermittently discharged into the closet-room.

My improvement has reference to that portion of the apparatus employed in the system above referred to which intermittently supplies air, and which in my said Letters Patent is distinguished as the "aerial disinfector." The particular aerial disinfector or air-disinfector which is shown and described in my said Letters Patent contains an air suction and forcing device—a bellows-like instrumentality—which is actuated by the movement of the water-closet lid or other appropriate part of the closet, and operates first to draw in outside air and then to force it out into the closet-room through a liquid—such as thymol solution—with whose vapor the air is charged. This device, while effective for the purposes for which it was designed, is nevertheless somewhat complicated and expensive, and is liable to get out of order.

I have found that in lieu of employing an air-forcing apparatus I can effect the diffusion of the charged air by means of the evaporation of the disinfecting or antiseptic solution, the agent or instrumentality through which the solution is brought to a position where it can be thus diffused by evaporation being, as before, connected with and operated by the closet-lid, seat, water-lift, door, or any other part of the closet or closet-room which is moved whenever the water-closet is entered or used. The instrumentality which I employ for this purpose is a plunger clothed or provided with an absorbent material and movable in a receptacle containing thymol or other disinfecting or antiseptic solution. When the plunger moves in one direction it enters the solution, which is taken up by the absorbent. When it is moved in the opposite direction it is carried away from the solution and brought to a position in which the liquid taken up by the absorbent material is exposed to circulating air and is free to evaporate and escape into the room. The plunger obtains its movement from some appropriate part of the closet—preferably the water-closet lid—in the same way as does the air-forcing device in my hereinbefore-recited Letters Patent.

The nature of my improvement and the manner in which the same is or may be carried into effect will be understood by reference to the accompanying drawings, in which—

Figure 1 is a diagrammatic elevation of the whole apparatus, commonly known as the "germicide." Fig. 2 is a view of the case of the apparatus with its front removed, so as to disclose the parts within.

A is the box, containing chloride of zinc or other disinfecting substance. From the water-service pipe extends a small pipe, *a*, which terminates in a faucet, *a'*, overhanging the box A. Water in quantity determined by the faucet trickles from the faucet into the box, and, passing down over the chloride of zinc, makes its way out, impregnated with the zinc chloride, through an overflow-pipe, whence it is discharged continuously into the bowl of the water-closet. This portion of the apparatus is the "liquid-disinfector," so called in my aforesaid Letters Patent, and requires no further explanation.

I come now to the "air-disinfector," in which my present improvement is comprised.

Within the case D, above the box A, is a box or chamber, E, which contains a solution of thymol or other proper disinfectant or antiseptic. Through the closed top of the box E extends vertically a well-tube, F, which reaches to the bottom of the box, and at its upper end stands above the top of the box. This tube communicates with the interior of the box through a hole, *c*, at or near its lower end, and is intended to receive and guide the plunger G, which fits and is vertically movable in it. The plunger is made preferably of cast lead, with slightly-enlarged sides *d*, which fit against the walls of the well-tube F. Between the enlarged ends or sides *d* the plunger is covered with felt or other suitable absorbing material, $i$, the surface of which is very nearly flush with the adjoining faces of the parts $d$, there being only sufficient difference to prevent the felt from rubbing unduly against the walls of the tube. The length of the plunger is preferably less than that of the tube, so that when the former is lowered to the extent required its top will not quite reach to, or at least will not extend above, the top of the tube. Thus the plunger, when lowered, will be completely inclosed by the tube, with the effect of preventing appreciable evaporation of the thymol solution so long as the plunger occupies this position.

The box E is provided with an opening closed tightly by a screw-cap, $e$. The box can be filled with the solution through this hole or through the well-tube F. When, after the solution is in, the box is closed tight, the only escape for the liquid is through the opening $c$ into the well-tube. The level of the liquid in this well-tube will, however, as is manifest, owing to differences in atmospheric pressure, be considerably lower than that of the body of liquid in the box. The plunger in this instance is designed to be operated by the closet-lid H; and to this end it is connected therewith by a cord or chain, $f$, which is attached at one end to the lid, and, passing thence over and around pulleys $g\,g$ in the case D, is attached at the other end to the plunger. The arrangement is such that the lid, when raised, will permit the plunger to descend into the well, so as to have contact with the liquid therein, and when lowered will lift the plunger so as to be out of contact with the liquid and for the most part out of the well. In this position the liquid previously taken up by its absorbent clothing is exposed to the circumambient air and free to evaporate, the vapors thus given off passing through the opening or grating $h$ in the front of the case D and being diffused throughout the room.

It is manifest, as hereinbefore stated, that the diffusing-plunger may obtain its motion not alone from the closet-lid, although this is the most convenient instrumentality, but from any other appropriate part of the closet or closet-room which is adapted to be moved when the closet is entered or used. It is also manifest that the particular means employed to connect the diffusing-plunger with the part from which it derives its movement may be widely varied.

What I claim, and desire to secure by Letters Patent, is—

The combination, with a water-closet or the like, of a vessel to contain antiseptic or disinfecting liquid, and an absorbent diffusing-plunger connected with and operated by the closet-lid or other appropriate part of the closet or closet-room, substantially as and for the purposes hereinbefore set forth.

In testimony whereof I have hereunto set my hand this 7th day of November, 1881.

E. J. MALLETT, Jr.

Witnesses:
 M. BAILEY,
 E. A. DICK.